United States Patent
Robitzsch et al.

(10) Patent No.: US 10,812,280 B2
(45) Date of Patent: Oct. 20, 2020

(54) ENABLING HTTP CONTENT INTEGRITY FOR CO-INCIDENTAL MULTICAST DELIVERY IN INFORMATION-CENTRIC NETWORKS

(71) Applicant: IDAC Holdings, Inc., Wilmington, DE (US)

(72) Inventors: Sebastian Robitzsch, London (GB); Dirk Trossen, London (GB)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 16/312,181

(22) PCT Filed: Jun. 30, 2017

(86) PCT No.: PCT/US2017/040432
§ 371 (c)(1),
(2) Date: Dec. 20, 2018

(87) PCT Pub. No.: WO2018/006042
PCT Pub. Date: Jan. 4, 2018

(65) Prior Publication Data
US 2019/0199540 A1    Jun. 27, 2019

Related U.S. Application Data

(60) Provisional application No. 62/357,868, filed on Jul. 1, 2016.

(51) Int. Cl.
*H04L 29/06*   (2006.01)
*H04L 12/18*   (2006.01)
*H04L 29/08*   (2006.01)

(52) U.S. Cl.
CPC ............ *H04L 12/189* (2013.01); *H04L 67/02* (2013.01); *H04L 67/28* (2013.01); *H04L 67/42* (2013.01)

(58) Field of Classification Search
CPC .................................................... H04L 12/189
See application file for complete search history.

(56) References Cited

U.S. PATENT DOCUMENTS 8,559,434 B2   10/2013   Esteve Rothenberg
2010/0235471 A1   9/2010   Parikh
(Continued)

FOREIGN PATENT DOCUMENTS

EP          2611111        7/2013
WO        2016033487      3/2016
(Continued)

OTHER PUBLICATIONS

Trossen, el al., "Final Updated Architecture". PURSUIT Publish Subscribe Internet Technology FP7-INFSO-ICT-257217, Deliverable D2.5, Mar. 5, 2013.
(Continued)

*Primary Examiner* — Adnan M Mirza
(74) *Attorney, Agent, or Firm* — Invention Mine LLC

(57) ABSTRACT

Employing proxy rule identifiers to ensure the integrity of content delivered over an HTTP-over-ICN system. An exemplary method is performed by a client-side network attachment point (cNAP) on an information-centric network (ICN). The cNAP receives an HTTP request that includes a resource identifier and at least one header field. The cNAP generates a proxy rule identifier (PRID) based on the header field(s) and a content identifier (CID) based on the resource identifier. The PRID may be generated by applying a hash function to a string that includes header field data. The cNAP sends an outgoing ICN message that includes the CID and the PRID. In response, the cNAP receives an incoming ICN message that includes an HTTP response, a PRID, and a CID. The cNAP and directs the HTTP response to the appropriate client(s) based on the PRID and CID.

20 Claims, 9 Drawing Sheets

(56) References Cited

U.S. PATENT DOCUMENTS

| | | | |
|---|---|---|---|
| 2014/0020102 A1 | 1/2014 | Srinivasan | |
| 2015/0312381 A1* | 10/2015 | Savolainen | H04L 51/38 709/204 |
| 2016/0197831 A1* | 7/2016 | De Foy | H04L 45/7453 370/392 |
| 2017/0237660 A1 | 8/2017 | Trossen | |

FOREIGN PATENT DOCUMENTS

| | | |
|---|---|---|
| WO | 2016123516 | 8/2016 |
| WO | 2016201395 | 12/2016 |

OTHER PUBLICATIONS

International Search Report and Written Opinion of the International Searching Authority for PCT/US2017/040432 dated Sep. 12, 2017, 16 pages.

White, G., et. al., "Content Delivery with Content Centric Networking". Cable Television Laboratories, Feb. 2016, pp. 1-26.

Fayazbakhsh, S., et. al., "Less Pain, Most of The Gain: Incrementally Deployable ICN". SIGCOMM, ACM, Aug. 12-16, 2013, pp. 147-158.

International Preliminary Report on Patentability for PCT/US2017/040432 dated Jan. 1, 2019.

Nottingham, M., et. al., "HTTP Header Field Registrations". Network Working Group, Category: Informational, RFC: 4229, available online at: http://tools.ietf.org/html/rfc4229, Dec. 2005, pp. 1-53.

Cooper, I., et. al., "Internet Web Replication & Caching Taxonomy". Network Working Group, Category: Informational, RFC: 3040, available online at: https://tools.ietf.org/html/rfc3040, Jan. 2001, pp. 1-32.

Al-Khalidi, M., et. al., "POINT: IP Over LCN—The Better IP". Deliverable D4.1, Evaluation Plan and Initial Validation Report, Dec. 16, 2015, pp. 1-40.

Hoffman, P., et. al., "The DNS-Based Authentication of Named Entities (DANE) Transport Layer Security (TLS) Protocol: TLSA". Internet Engineering Task Force (IETF), Category: Standards Track, RFC: 6698, available online at: https://tools.ietf.org/html/rfc6698, Aug. 2012, pp. 1-37.

Jacobson, V., et. al., "Networking Named Content". CoNEXT Proceedings of the 5th International Conference on Emerging Networking Experiments and Technologies, ACM, Dec. 1-4, 2009, pp. 1-12.

Jarmoc, J. "Transitive Trust: SSL/TLS Interception Proxies". Secure Works, available at https://www.secureworks.com/research/transitive-trust, Mar. 21, 2012, 25 pages.

Jokela, P., et. al., "LIPSIN: Line Speed Publish/Subscribe Inter-Networking". ACM SIGCOMM Computer Communication Review, vol. 39, No. 4, Aug. 17-21, 2009, pp. 195-206.

Liang et al., "When HTTP Meets CDN: A Case of Authentication in Delegated Service". IEEE Symposium on Security and Privacy, (2014), pp. 67-82.

Trossen, et. al., "Designing and Realizing an Information-Centric Internet". IEEE Communications Magazine, vol. 50, No. 7, Jul. 2012, pp. 60-67.

Xylomenos et. al., "A Survey of Information-Centric Networking Research". IEEE Communications Surveys and Tutorials, vol. 16, No. 2, (2013), pp. 1-26.

Xylomenos et. al., "Socket Emulation Over A Publish/Subscribe Network Architecture". Proceedings of the Future Network and Mobile Summit, (2010), pp. 1-5.

International Preliminary Report on Patentability for PCT/US2016/015713 completed on Feb. 22, 2017, 16 pages.

International Search Report and Written Opinion of the International Searching Authority for PCT/US2016/015713 dated Apr. 24, 2016, 13 pages.

International Preliminary Report on Patentability for PCT/US2016/037121 dated Dec. 12, 2017, 7 pages.

International Search Report and Written Opinion of the International Searching Authority for PCT/US2016/037121 dated Sep. 9, 2016, 10 pages.

Corujo, D., et. al., "ICN Management Considerations; draft-corujo-icn-mgmt-05". ICNRG, Intended Status: Informational, Version: 05, Jul. 1, 2014, pp. 1-18.

Borislava, G., et. al., "On Flexible Topology Formation in Publish-Subscribe Networks". In IEEE International Conference on Communications (ICC), (2012), pp. 5883-5888.

* cited by examiner

ENABLING HTTP CONTENT INTEGRITY FOR CO-INCIDENTAL MULTICAST DELIVERY IN INFORMATION-CENTRIC NETWORKS

CROSS-REFERENCE TO RELATED APPLICATIONS

The present application is a national stage application under 35 U.S.C. 371 of International Application No. PCT/US2017/040432, entitled ENABLING HTTP CONTENT INTEGRITY FOR CO-INCIDENTAL MULTICAST DELIVERY IN INFORMATION-CENTRIC NETWORKS, filed on Jun. 30, 2017, which claims benefit under 35 U.S.C. § 119(e) from U.S. Provisional Patent Application Ser. No. 62/357,868, entitled "ENABLING HTTP CONTENT INTEGRITY FOR CO-INCIDENTAL MULTICAST DELIVERY IN SURROGATE-ENABLED INFORMATION-CENTRIC NETWORKS," filed Jul. 1, 2016, the entirety of which is incorporated herein by reference.

BACKGROUND

Information-centric networking (ICN) constitutes a new paradigm in which content is exchanged by means of information addressing, while connecting appropriate networked entities that are suitable to act as a source of information towards the networked entity that requested the content.

Novel architectures have been proposed in this space, requiring the partial replacement of current network infrastructure in order to realize the desired network-level functions of these solutions. Migration scenarios foresee that the new proposed architectures could be realized as an overlay over existing, e.g., IP- or local Ethernet-based, architectures. Such migration, however, would still require the transition of the user equipment (UE) to an ICN-based solution. With IP-based applications providing a broad range of Internet services in use nowadays, transitioning all of these applications can easily been seen as a much harder task than the pure transition of the network-level functionality, e.g., protocol stack implementation, in the UE since it also requires the transition of the server-side components, e.g., e-shopping web-servers and alike. Hence, one can assume that IP-based services, and with it purely IP-based UEs, will continue to exist for some time to come.

The transition to ICN at the network level, on the other hand, promises many benefits, such as increased efficiency through the usage of in-network caches and the spatial/temporal decoupling of sender/receiver in general, the utilization of SDN upgrades for better flow management, etc.

The disclosure "Methods and Systems for Anchoring Hypertext Transfer Protocol (HTTP) Level Services in an Information Centric Network (ICN)," WO2016123516A1, incorporated herein by reference in its entirety, outlines systems and methods for providing HTTP-level services over an ICN network, mapping HTTP request and response methods into appropriate ICN packets, published towards appropriate ICN names. Said mapping is performed at the Network Attachment Point (NAP) of the client and server, respectively, as well as at the ICN border GW for cases of HTTP methods being sent towards and from peering networks. With such methods, an increasing portion of current Internet-based service can be mapped onto ICN architectures.

The disclosure "Elastic Service Provisioning via HTTP-level Surrogate Management," U.S. Provisional Application Ser. No. 62/309,610 filed Mar. 17, 2016, incorporated herein by reference in its entirety, discloses an HTTP surrogate that refers to service endpoints at HTTP level that act on behalf of and with authority of an origin server. In RFC 3040, "Internet Web Replication & Caching Taxonomy," January 2001, a surrogate is a gateway co-located with an origin server, or at a different point in the network, to which is delegated the authority to operate on behalf of, and typically working in close co-operation with, one or more origin servers. Devices commonly known as "reverse proxies" and "(origin) server accelerators" are both more properly considered to be surrogates. Surrogates may be deployed close to the origin server, close to the locality, or throughout the network—a configuration similar to that of a Content Delivery Network (CDN). By placing surrogate servers at distributed network locations, the service can possibly be accessed with much shorter path and higher accessible bandwidth without the need to contact the service at its origin servers. Apart from all the benefits from the local direct content access, surrogates act on behalf of the origin server (and therefore the content's owner), they offer content owners greater control over their behavior than normal proxies, e.g., edge caches or traditional CDNs. As a result, they offer greater potential for improving performance, offloading the processing/network load from the origin server with transparent user experiences. Surrogates function similarly to mirror servers in that a fully qualified copy of the whole site is stored; however, the user is expected to be able to access a surrogate service using the same FQDN/URL rather than being redirected to different ones as mirror servers implement. Unlike standard HTTP intermediaries, surrogates offer finer control by the origin server and content owner because of their implied relationship.

The reintroduction of multicast for clients that happen to retrieve the same web resource at roughly the same time is based on the mechanics described in WO2016123516A1. As the entire network and transport layer is removed to exchange HTTP requests and their responses between one or more client NAPs (cNAPs) and one server NAP (sNAP), the mapping of an incoming HTTP response from a sNAP—delivered via co-incidental multicast—to a number of particular IP endpoints is an open issue. Situations having two IP clients requesting the same URL at roughly the same time has been described in WO2016123516A1. However, issues remain unsolved when the content in the HTTP response of a web server differs depending on specific information provided in the HTTP request header of the HTTP client. For instance, if a web client could not read an HTTP response properly due to HTTP application internal issues, the client may issue an HTTP request for the same resource again but using an HTTP header field "Range" requesting a particular range of bytes of the response only. Another kind of header information is the type of HTTP request method, with different request methods generally resulting in different HTTP responses (HTTP GET vs HTTP PUT or PUSH).

Furthermore, there are certain techniques possible when programming a full responsive web presence where the web server provides particular MIME-tagged content in different levels of quality depending on the client requesting the content. A range of available HTTP header fields is available, e.g. those described in RFC 4229, which may affect the content of an HTTP response.

SUMMARY

The systems and methods disclosed herein seek to address the integrity of HTTP content delivered over an HTTP-over- ICN system. In relation to the scenario where the additional information in an HTTP request header determines the content a web server provides under a given response URL, the present disclosure addresses the integrity of the content delivered via co-incidental multicast and the corresponding multicast group formation within the sNAP. In addition, the present disclosure addresses the issue of providing placed surrogates and their extended NAPs (eNAPs) with information as to how to treat an HTTP message equivalently to the treatment of that message by the original authoritative server.

An exemplary method is performed by a client network attachment point (cNAP) on an information-centric network (ICN). The cNAP receives from a client an HTTP request that includes a resource identifier and at least one header field. The cNAP generates a request proxy rule identifier (PRID) based on the header field(s) and generates a request content identifier (CID) based on the resource identifier. The cNAP sends an outgoing ICN message requesting data. The message includes the request CID, the request PRID and a node identifier of the cNAP. In response to the outgoing ICN message, the cNAP receives an incoming ICN message that includes an HTTP response, a received PRID, and a received CID. In response to a determination that the received PRID is the same as the request PRID and the received CID is the same as the request CID, the cNAP provides the HTTP response to the client.

In some embodiments, proxy rules are provided to each cNAP instructing the cNAP as to how to PRIDs are to be generated from the header field(s). Some proxy rules are FQDN-specific rules that are applicable only to resources requested using particular FQDNs (fully-qualified domain names). Other proxy rules are generic proxy rules that are applicable regardless of FQDN. In some embodiments, proxy rules indicate how header data is to be arranged into a data structure from which a PRID is determined. For example, a proxy rule may indicate how header data is to be arranged into attribute-value pairs of a string such as an XML data structure, and a hash function may be applied to the resulting string to generate a PRID.

In some embodiments, a method is performed by a client-side network attachment point (cNAP) on an information-centric network (ICN). In one such method, the cNAP receives from a client an HTTP request including a resource identifier and at least one header field. The cNAP generates a request proxy rule identifier (PRID) based on the at least one header field, generates a content identifier (CID) based on the host identifier (FQDN), and generates a reverse content identifier (rCID) based on the URL. The cNAP keeps an rCID to PRID mapping including the communication identifier of how to reach the client. The cNAP sends an outgoing ICN message requesting data, where the message includes the CID, the generated PRID, a node identifier of the cNAP and the HTTP request. In response to the outgoing ICN message, the cNAP receives an incoming ICN message that includes an HTTP response, a PRID, and an rCID. In response to a determination that the received rCID and PRID is the same as the request PRID and rCID, the cNAP provides the HTTP response to the client using the stored communication identifier.

In some embodiments, a method is performed by a server-side network attachment point (sNAP) on an information-centric network (ICN). In one such method, the sNAP receives an incoming ICN message that includes an HTTP request, a CID, an rCID, a PRID and a NID. In response to the ICN message, the sNAP creates a potential multicast group using the rCID and PRID and the NID as the group members. The sNAP sends out the HTTP request to an appropriate server using a pre-stored IP address and transport layer port identifier for that server. When receiving the HTTP response, the sNAP obtains the potential multicast group, which is still open for new members based on rCID and PRID information, and the sNAP then closes the multicast group. The sNAP subsequently publishes the HTTP response, rCID and PRID to all members in the multicast group.

BRIEF DESCRIPTION OF THE DRAWINGS

A more detailed understanding may be had from the following description, presented by way of example in conjunction with the accompanying drawings, wherein.

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Exemplary Network Hardware

Figure 1A:
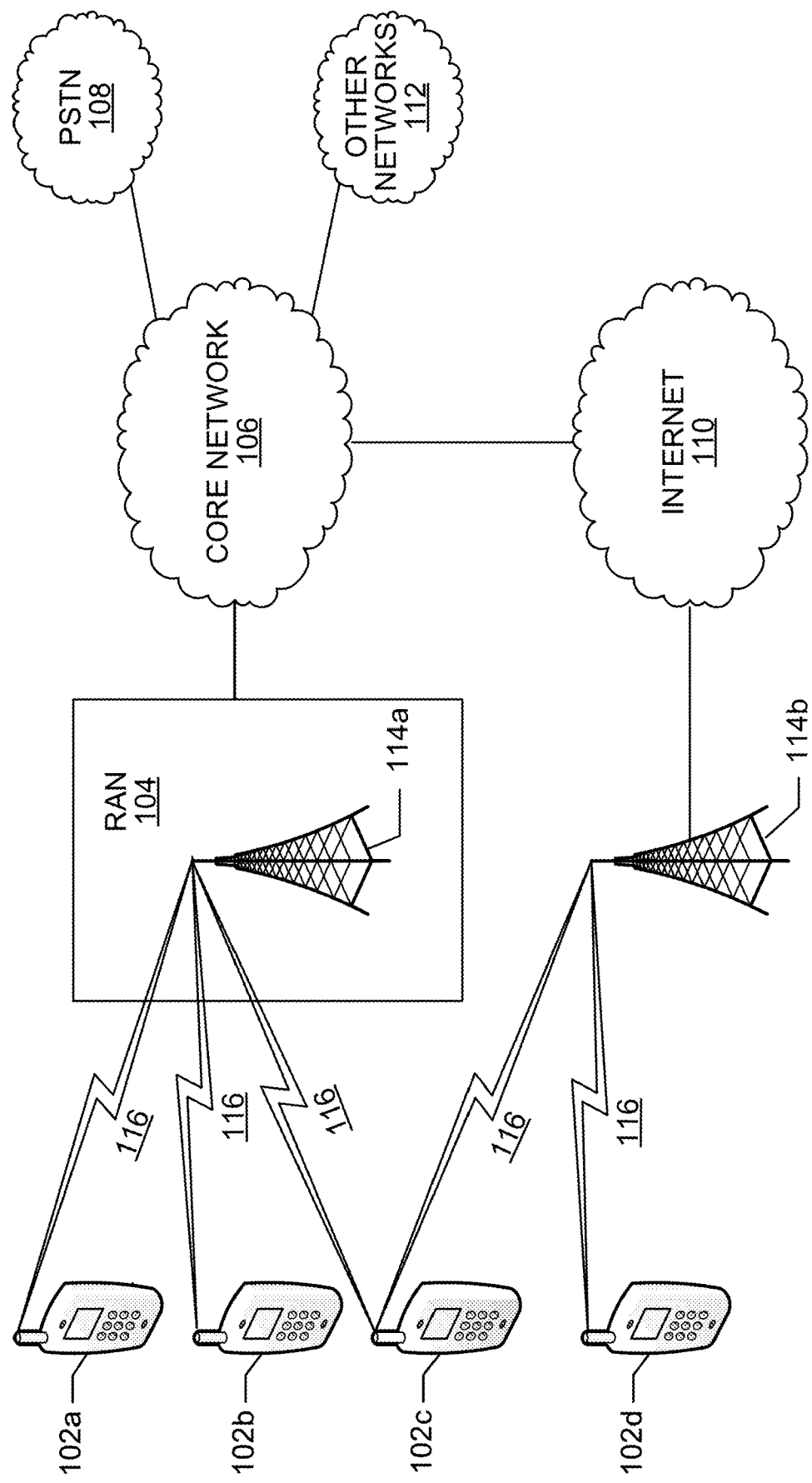
FIG. 1A depicts an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d m the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
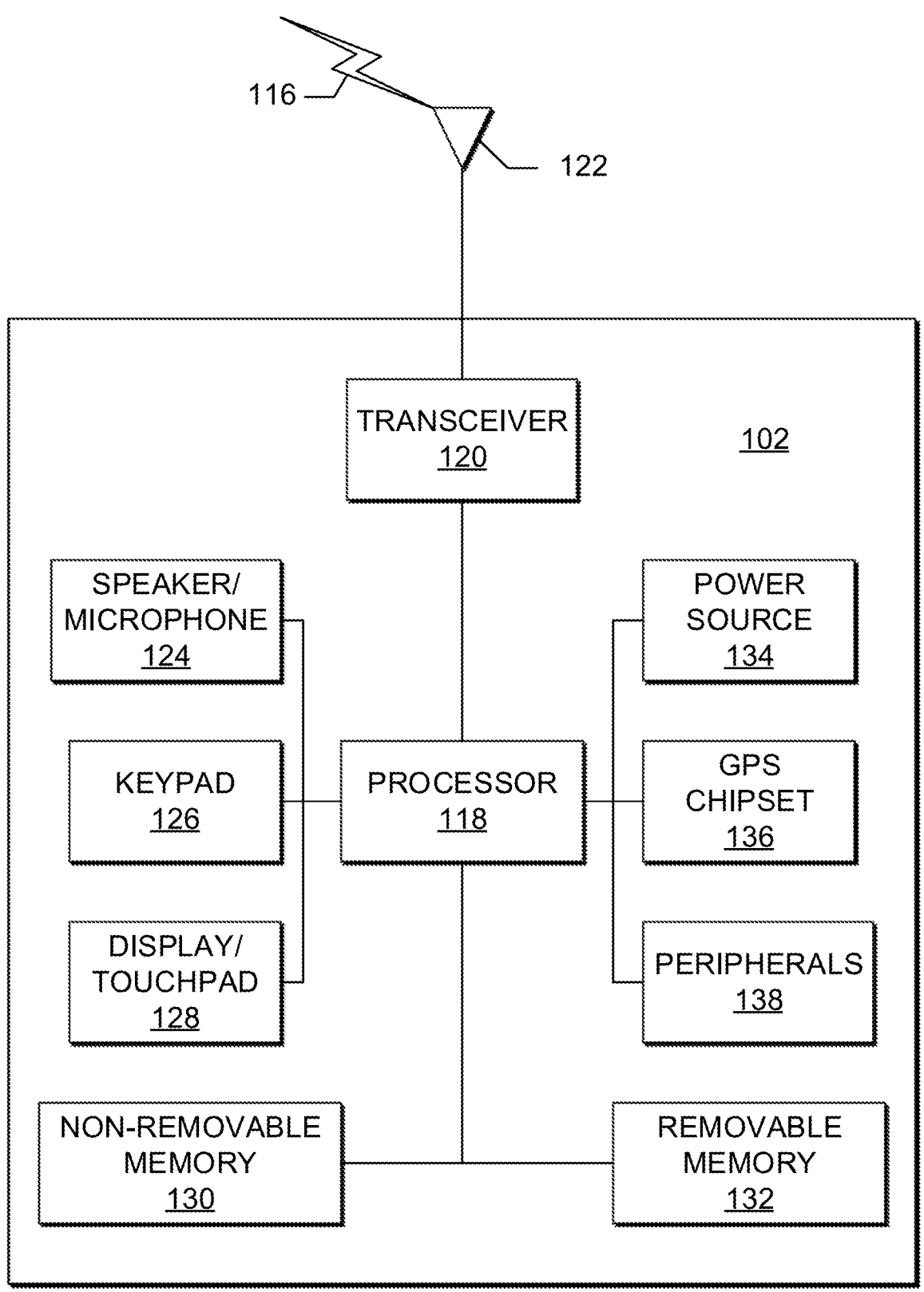
FIG. 1B depicts an example wireless transmit/receive unit (WTRU) that may be used within the communications system of FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
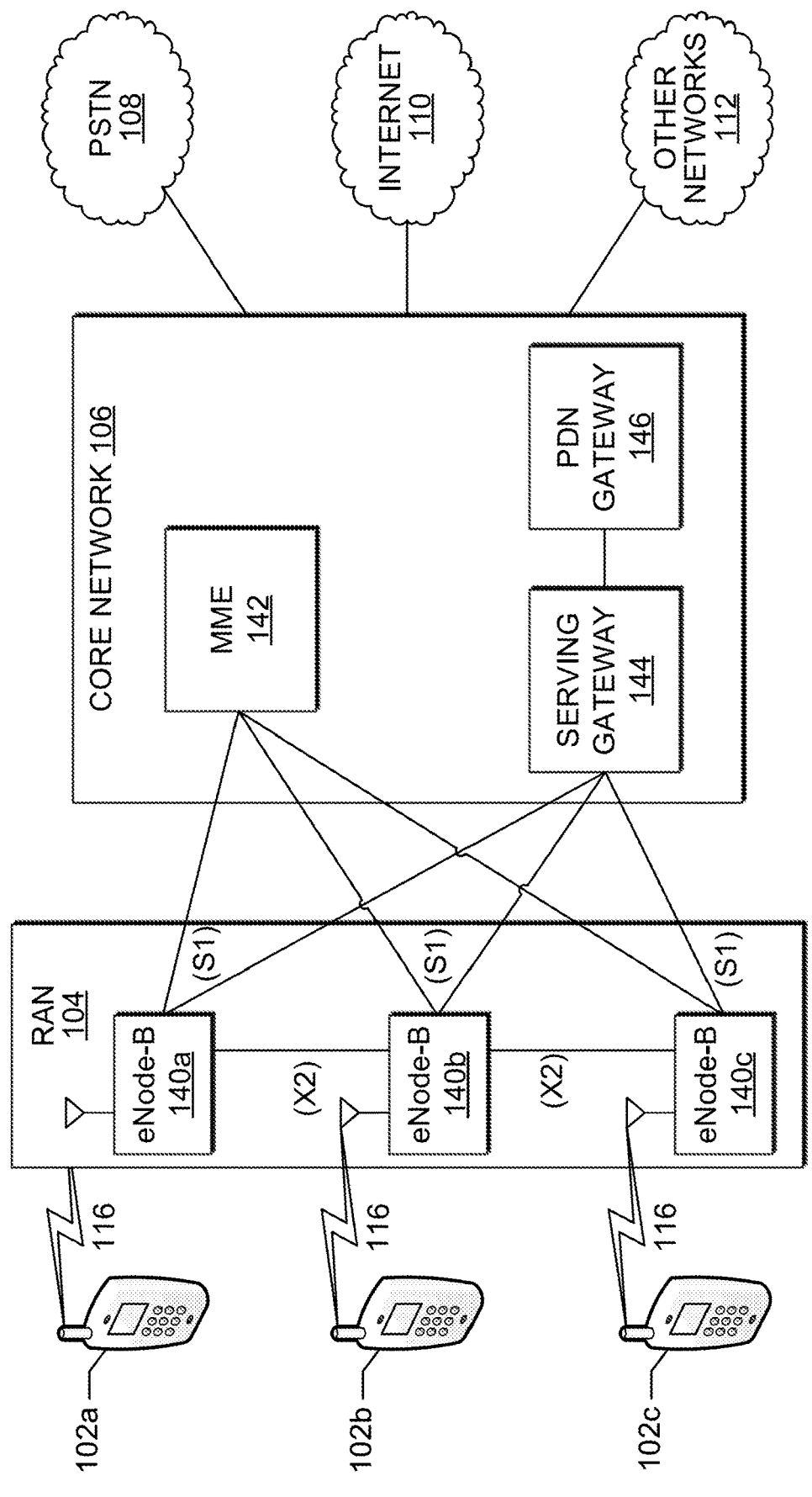
FIG. 1C depicts an example radio access network (RAN) and an example core network that may be used within the communications system of FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode-B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to other networks 112, which may include other wired or wireless networks that are owned and/or operated by other service providers.

HTTP-Over-ICN Systems and Methods

Figure 2:
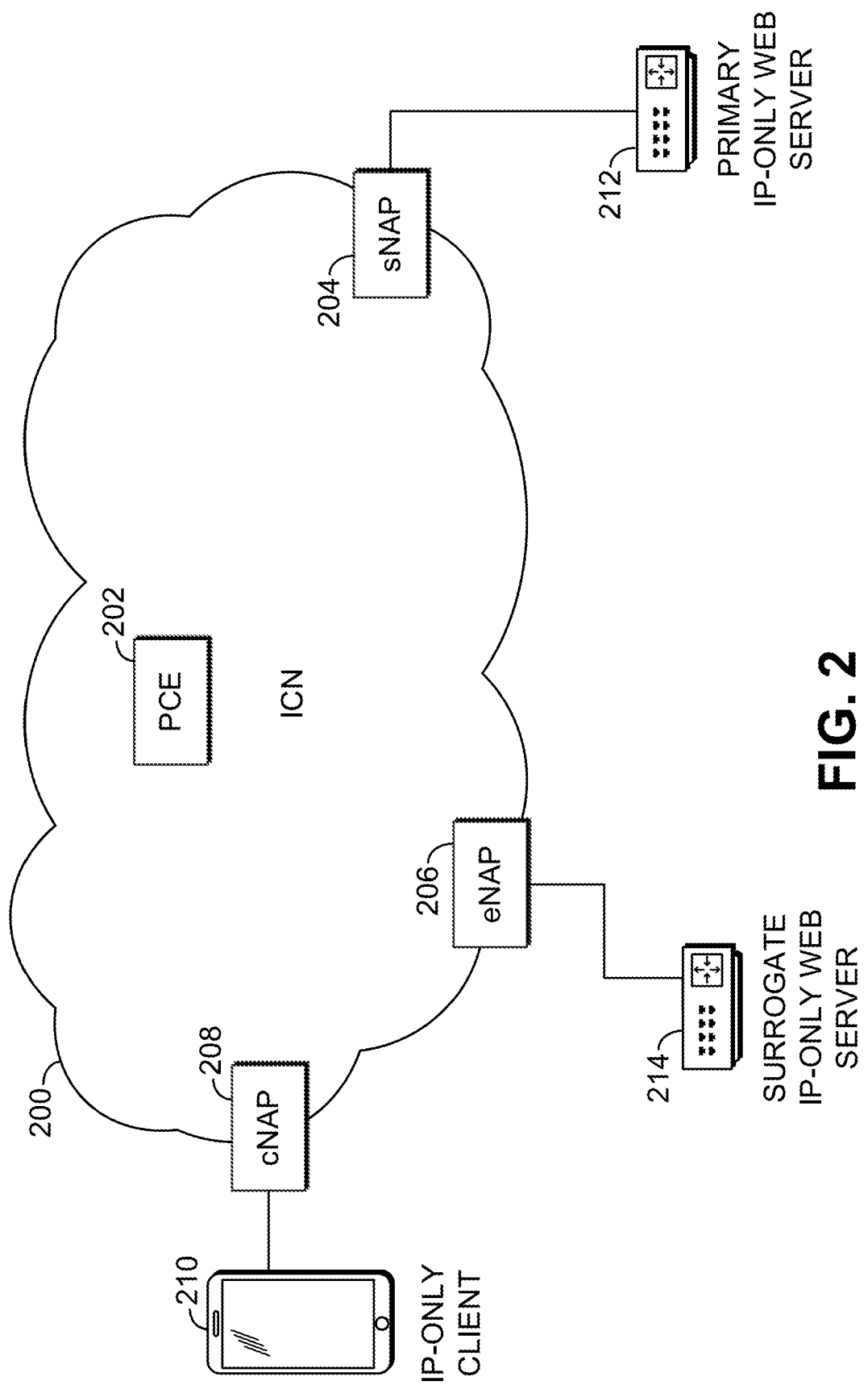
FIG. 2 depicts an embodiment of a system overview of the different NAP types that can exist in a surrogate-enabled flexible routing system.

Exemplary systems and methods disclosed herein utilize an HTTP-over-ICN infrastructure such as that described WO2016123516A1, in which Network Attachment Points (NAPs) provide standard IP connectivity towards IP-enabled devices. NAPs then encapsulate the received IP traffic into an appropriate ICN packet which is then published under a structured named information item. FIG. 2 shows one embodiment of a system overview of the different NAP types in an exemplary surrogate-enabled flexible routing system 200 with a Path Computation Element (PCE) 202 combining the ICN network elements Rendezvous (RV) and Topology Manager (TM).

Server-side NAPs (sNAPs) 204 are NAPs which serve a particular FQDN by subscribing to the ICN CID /http/fqdn and have the capability to form co-incidental multicast groups based on, e.g., the methods described in WO2016123516A1. Extended NAPs (eNAPs) 206 allow surrogates to be used akin to primary web servers. Extended NAPs provide an authoritative mirrored resource of the primary web server, which in some cases may be a fully virtualize resource environment. Client-side NAPs (cNAPs) 208 are NAPs which serve IP-only clients (e.g. client 210) and allow them to communicate with a web server (e.g. primary web server 212 or surrogate web server 214) via ICN 200 transparently.

In exemplary systems and methods disclosed herein, each NAP behaves as a transparent HTTP proxy which terminates the TCP session for HTTP traffic towards its IP endpoints (e.g., client as well as server). The HTTP proxy (e.g., NAP) then has the ability to further inspect the incoming HTTP message using two types of proxy rules, namely generic and FQDN-specific ones.

In some exemplary embodiments, generic proxy rules are mandatory fields that the proxy (e.g., an NAP) must react upon as otherwise the response is prone to not be the one the HTTP client was requesting, and the integrity of the entire web resource request is at risk. For instance, in such embodiments, the "Range" field or the HTTP request method in the HTTP request are taken into account when creating a multicast group at a sNAP, as otherwise the HTTP response from the web server associated with the sNAP would not be accepted by the web client associated with a cNAP.

In exemplary embodiments, FQDN-specific rules are customizable rules which the NAPs can take into account and which allow the content providers to tune the multicast creation towards their needs. For instance, audio/video/media content in HTTP responses can be encoded in lower quality for mobile endpoints which the web server determines based on a "User-Agent" field in the HTTP header. This behavior can be communicated to the NAP by providing a precise FQDN-specific proxy rule.

In exemplary embodiments, the proxy rule instances to be applied are generated at cNAPs when receiving the HTTP request from the UE (e.g., client 210). The same applies to HTTP responses received from a web server at sNAPs and eNAPs. Note that the proxy rules are not tied to a particular HTTP/TCP session, allowing the sNAP to create multicast groups using a single PRID which can be used by all cNAPs to map it back to their currently opened TCP sessions. These proxy rule instances are represented as a unique identifier across all NAPs for identical (same PRID) HTTP sessions. If sNAPs and eNAPs then provide HTTP responses via multicast, this proxy rule instance identifier serves as the only unique identifier used for all cNAPs to map it back to clients which requested this response. Said proxy rule instance identifier is carried along with every HTTP request and HTTP response publication.

Populating Generic and FQDN-Specific Proxy Rules

For all kinds of NAPs (client, server, and surrogate/extended NAPs), as shown in FIG. 2, generic and FQDN-specific proxy rules are populated, and if a proxy rule update is available in the primary NAP all cNAPs and eNAPs promptly refresh their existing rule(s).

In some embodiments, the distribution of proxy rules is realized via a dedicated namespace which allows all NAPs to retrieve a particular FQDN-specific proxy rule from the primary server, while the rules within this namespace may be distributed via the underlying ICN publish/subscribe network. The integrity of HTTP content delivery via the disclosed co-incidental multicast systems and methods, as described in WO2016123516A1, may be ensured with logic within the NAPs and the transfer of a unique proxy rule identifier in each HTTP publication in the ICN network.

Proxy Rules Namespace

Figure 3:
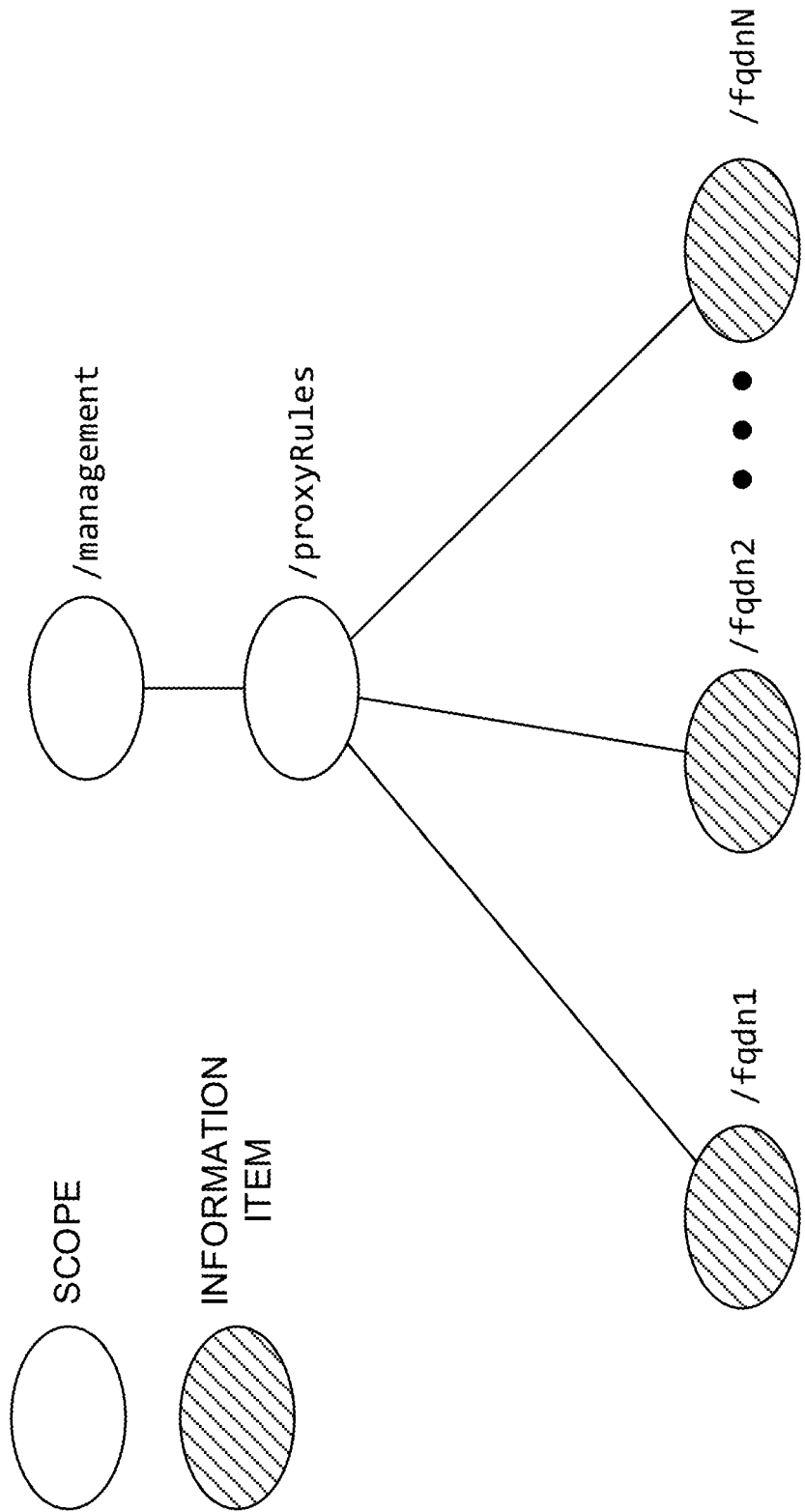
FIG. 3 depicts an embodiment of a namespace with scope identifiers for use with proxy rules.

To enable the distribution of proxy rules from the primary NAP serving a particular FQDN, a dedicated namespace is disclosed under the root scope identifier /management. Said root scope is shown as a symbolic name here and is may be subject to agreement or standardization, represented as a particular numbered identifier or name in particular embodiments. FIG. 3 depicts an embodiment of the namespace with scope identifiers illustrated as white circles and information identifiers—under which data can be published—as shaded circles. Under the scope path /management/proxyRules, each FQDN is represented as an information item with the value being a hash over the string representation of an FQDN, in one possible embodiment. This information item may be used for exchanging proxy rules the first time between the primary sNAP and a NAP which has not received the proxy rules for a particular FQDN, as well as updated proxy rules for a particular FQDN. The detailed operations on how the proposed proxy rules namespace is used can be found below.

It is appreciated that the namespace in FIG. 3 may also utilize dedicated proxy rule items under each FQDN for initial and updated propagation by interpreting the FQDN as a scope and adding /initial and /update information items under each FQDN scope. In this case, the initial item may be used for communicating an initial set of rules every time a NAP attempts to obtain such rules, while the update item may be used for future updates. Such an alternative namespace may, for instance, be utilized for publish/subscribe systems that do not notify the addition of subscribers separately to the publisher, therefore requiring the suggested separation of conveying the initial state separately from any updated state.

In the following disclosure, set forth are the operations and messages exchanged based on the namespace in FIG. 3 for the sake of simplicity. However, it will be apparent to one of ordinary skill in the art to modify the various embodiments discussed throughout to utilize the alternate namespace, and/or others as appropriate for particular scenarios.

Populating Proxy Rules to cNAPs

Figure 4:
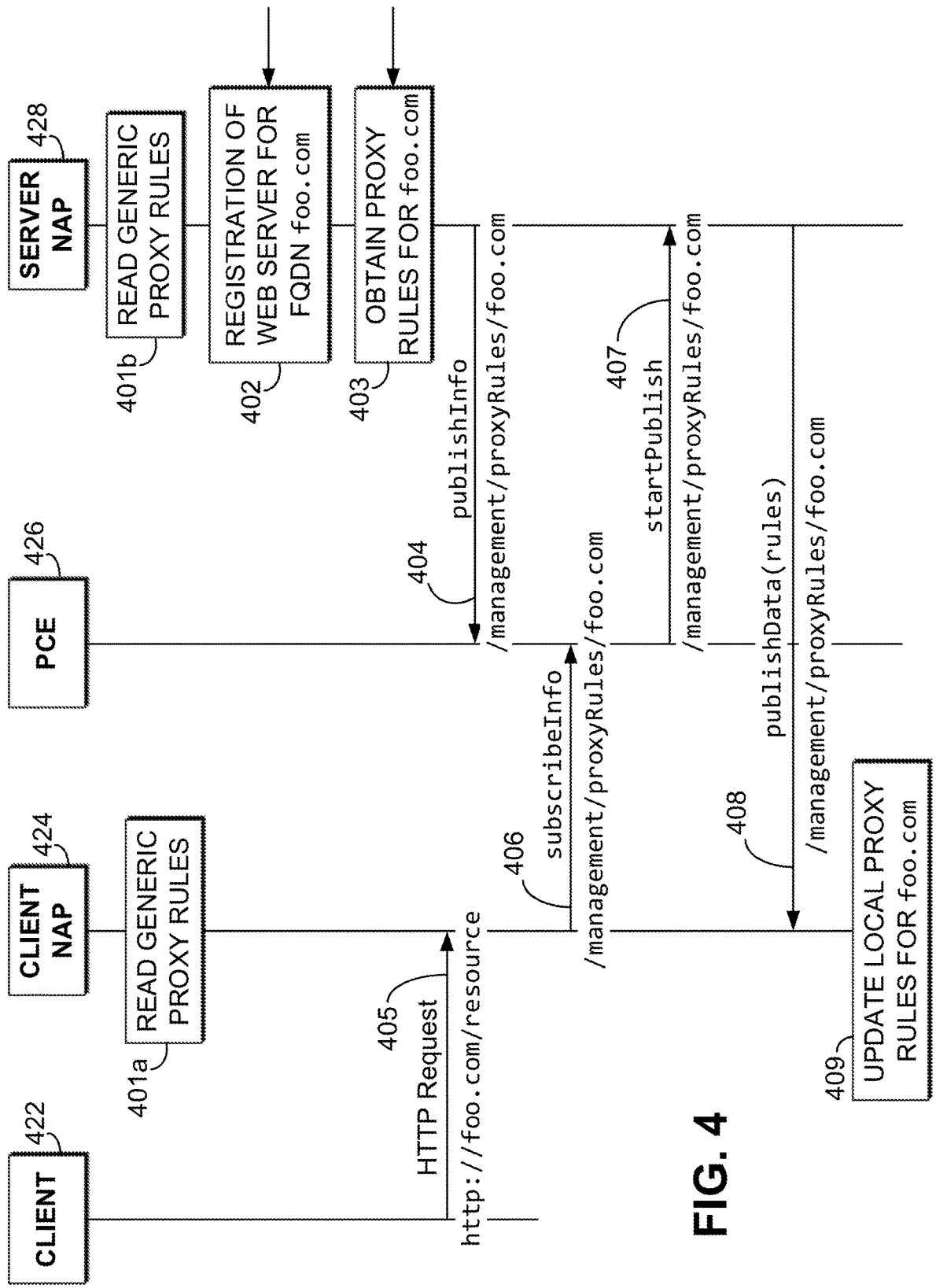
FIG. 4 depicts a message sequence chart for an embodiment of the distribution of proxy rules from the primary sNAP to a cNAP or eNAP using the namespace set forth in relation to FIG. 3.

One embodiment of the distribution of proxy rules from the primary sNAP to a cNAP or eNAP using the namespace set forth in relation to FIG. 3 is shown in FIG. 4 using a Message Sequence Chart (MSC). The network elements shown in FIG. 4 are an IP endpoint (client 422) which is served by a cNAP 424, a Path Computation Element (PCE) 426 combining the ICN elements Rendezvous (RV) and Topology Manager (TM) as well as a sNAP 428, as shown in FIG. 2.

All mandatory generic proxy rules may be distributed prior to the start-up of a NAP, e.g., through a configuration file which comes with each NAP deployment. The methods and their meaning behind the enumerated message flows in FIG. 4 are described as follows.

In steps 401a and 401b, th cNAP and sNAP respectively read their generic proxy rules time-independently from each other at their boot-up phase, either by reading the configuration file or subscribing to the appropriate information item in the namespace.

In step 402, a new web server for the fully-qualified domain name (FQDN) foo.com is registered at the sNAP 428 using a specific registration interface. The registration interface may receive the IP information regarding where the sNAP can reach the computing entities to provide the resource requested either as a single fixed IP endpoint (web server) or a hypervisor which maintains and operates a server farm.

In step 403, the sNAP 428 receives FQDN-specific proxy rules provided by an external entity. Such proxy rules may be provided by some management entity, e.g., operator or service provider based, or directly through the provider of the FQDN (which may require awareness for the support of such rules towards the FQDN service provider).

In step 404, the sNAP 428 advertises the availability of proxy rules for the FQDN foo.com under the scope path /management/proxyRules by hashing the FQDN and placing the value as an information identifier under the mentioned scope path.

This completes the initialization of the primary sNAP 428 and any cNAP 424 in the ICN network. The remaining message sequence in FIG. 4 illustrates the retrieval of FQDN-specific proxy rules by a cNAP upon the arrival of an HTTP request for the FQDN foo.com for the very first time.

In step 405, an IP endpoint 422 served by the cNAP 424 issues an HTTP request for foo.com/resource which the cNAP receives through its transparent HTTP proxy functionality which terminates the TCP session initiated by the client.

In step 406, upon the arrival of each HTTP request the cNAP checks if FQDN-specific proxy rules exist for the host from which a resource is requested. If the cNAP cannot find any such rule, it subscribes to the information item foo.com (e.g. using a hashed FQDN) under the father scope /management/proxyRules.

The PCE 426 matches the cNAP 424 as a subscriber to the sNAP 428 as a publisher (see step 404) for the Content Identifier (CID) /management/proxyRules/foo.com. Consequently, the PCE in step 407 issues a start publish event to the sNAP for this particular CID.

In step 408, the sNAP publishes the proxy rules received in 403 to the cNAP using a pre-defined format, which is described in further detail below.

In step 409, the cNAP updates its local proxy rules for foo.com and can continue with its operations to publish the HTTP request to the sNAP, as described below. This completes the operations at cNAPs and sNAPs in this exemplary embodiment to retrieve generic and FQDN-specific proxy rules.

Populating Proxy Rules to eNAPs

Figure 5:
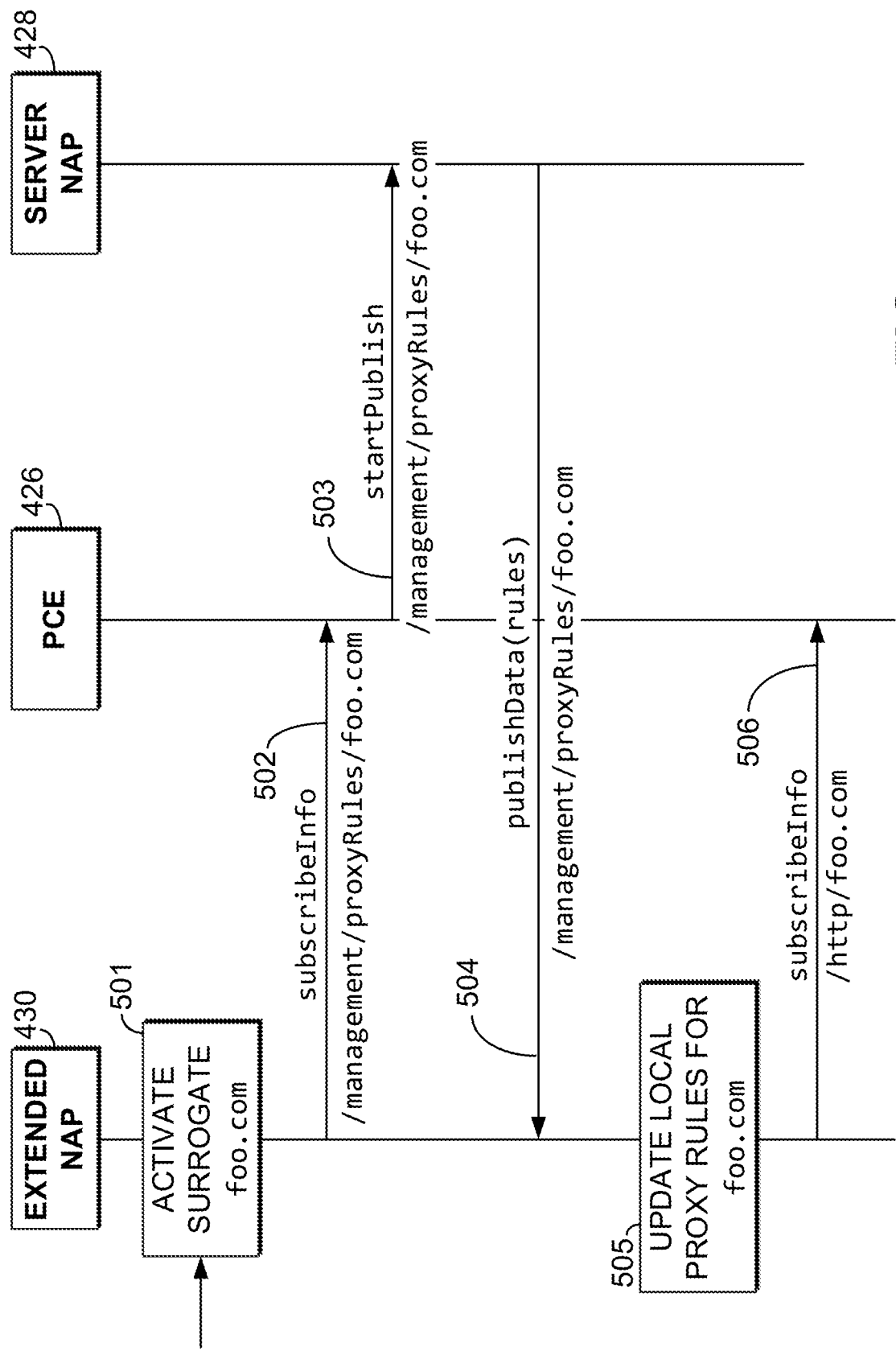
FIG. 5 depicts a message sequence chart for an embodiment of an eNAP obtaining proxy rules for the FQDN(s) it is supposed to serve.

NAPs enabling an authoritative copy of a primary web server at a different location within the ICN network (e.g., surrogates) are referred to as extended NAPs (eNAPs). A message sequence chart for an embodiment of the procedures for eNAPs to obtain proxy rules for the FQDN(s) they are supposed to serve is depicted in FIG. 5. This illustration depicts three network elements, namely an eNAP 430, a PCE 426, and the primary NAP (sNAP) 428 serving the FQDN foo.com.

In step 501, an external element triggers the activation of a particular IP endpoint as a surrogate at the eNAP 430. This activation command to the eNAP comprises—among other data—the FQDN which the eNAP is supposed to serve. The operation of such activation, and other eNAP functionality, may be implemented as described in further detail in Provisional App. No. 62/309,610.

In step 502, following the same general procedure as for cNAPs, the eNAP subscribes to the CID /management/proxyRules/foo.com in order to receive the proxy rules from the primary sNAP.

In step 503, the PCE informs the sNAP that a new subscriber has become available under /management/proxyRules/foo.com. Note, following the procedure described above in relation to FIG. 3, the eNAP has been subscribed to the aforementioned CID in order to trigger a publish/subscribe match in the PCE.

In step 504, the sNAP publishes the proxy rules to the eNAP using a pre-defined format, one example of which is described below.

In step 505, the eNAP updates its proxy rules for foo.com which allows it to form co-incidental multicast groups without compromising the integrity of delivered HTTP content.

In step 506, the eNAP subscribes to the information item foo.com under the root namespace identifier /http allowing IP-only clients to request web resources. This step may be performed using techniques described in WO2016123516A1. This completes the retrieval of FQDN-specific proxy rules of an eNAP in an embodiment of a surrogate activation in this exemplary embodiment. As noted above, the namespace may also utilize dedicated proxy rule items under each FQDN for initial and updated propagation by interpreting the FQDN as a scope and adding /initial and /update information items under each FQDN scope, thereby accommodating publish/subscribe systems that do not notify the addition of subscribers separately to the publisher.

Updating Operations Across all NAPs

Figure 6:
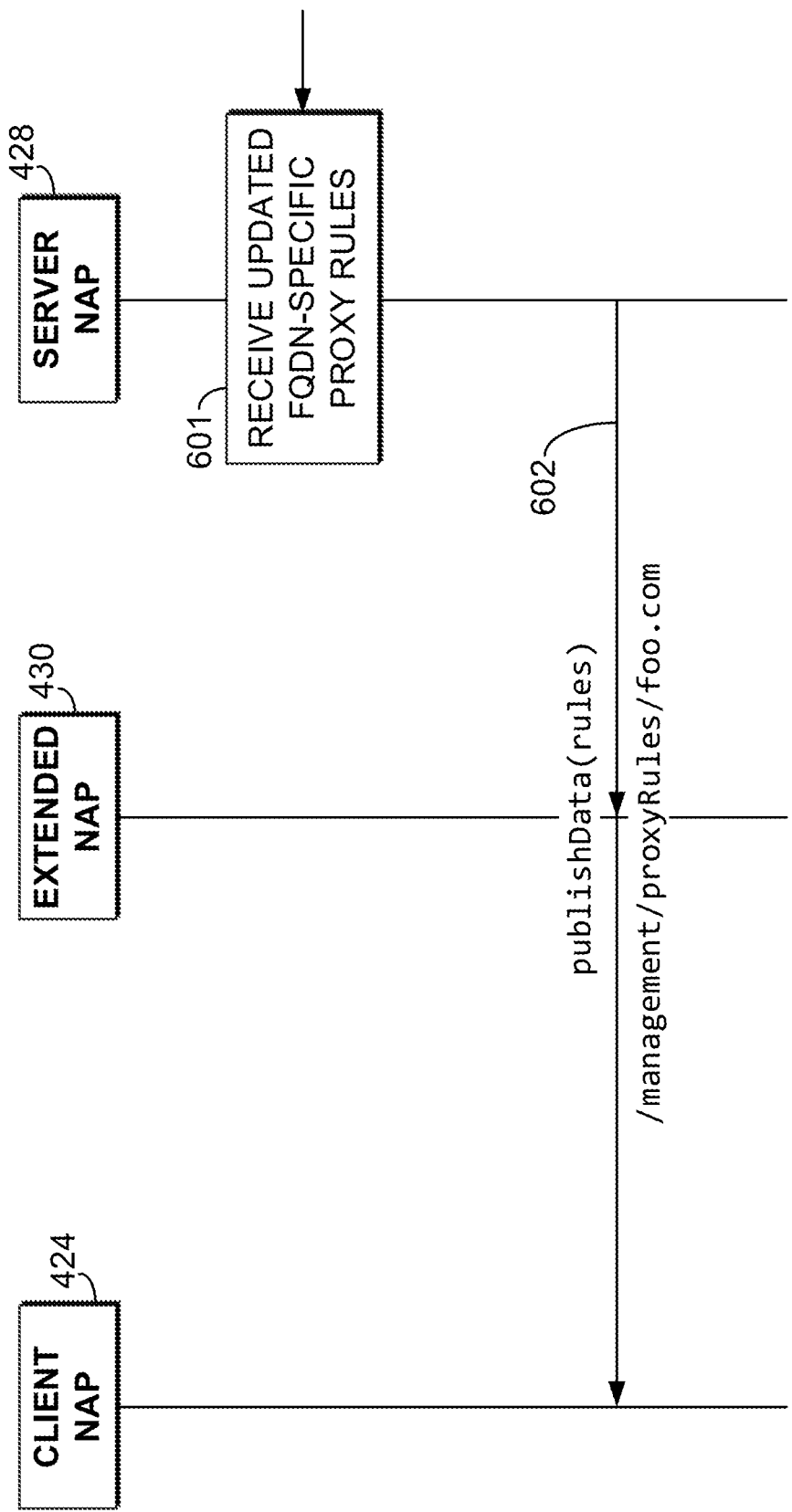
FIG. 6 depicts a message sequence chart for an embodiment of a sNAP forwarding updated proxy rules to all NAPs which have previously retrieved rules for the particular FQDN.

In one embodiment, illustrated in FIG. 6, a sNAP receives an update about FQDN-specific proxy rules and the information is forwarded to all NAPs which have retrieved those rules for the particular FQDN before. At the end of the initial retrieval of FQDN-specific proxy rules, cNAPs and eNAPs stay subscribed to CID /management/proxyRules/foo.com, as described above. Therefore, the sNAP does not need to advertise the availability of information under /management/proxyRules/foo.com anymore in order to be able to publish data towards all subscribers.

In step 601, the sNAP receives an update to proxy rules for a particular FQDN, foo.com. The format of the rules may be identical to the initial retrieval of the rules.

In step 602, the sNAP publishes the received FQDN-specific proxy rules to all NAPs subscribed to it, e.g., cNAP 424 and eNAP 430, using CID /management/proxyRules/foo.com.

As noted above, a separate update information item may alternatively be used. In this case, the cNAP and eNAP would subscribe to this dedicated update item after receiving the initial proxy rule, as described previously.

This completes the message exchange in this exemplary embodiment between sNAP and client and extended NAPs to obtain updated FQDN-specific proxy rules.

Exemplary Proxy Rules Format

For describing the proxy rules, one embodiment to store and exchange generic and FQDN-specific proxy rules is XML following W3C's DOM specification for this particular file format. Alternative formats that allow structured information may be used in some embodiments. XML is one example that is widely used and supported. Other solutions include relational databases, e.g., SQL.

Proxy rules act upon the existence of header fields in the HTTP request and their values. Header fields that are mandatory to ensure the delivery of the correct HTTP response are provided within a rule element encapsulated in the generic mark-up element, e.g. in the following format.

```
<generic>
    <rule>Range</rule>
    <rule>HTTP</rule>
</generic>
```

FQDN-specific proxy rules may be declared in an element fqdn with the actual FQDN as the attribute id. Within the fqdn element, the two elements host and headerfields may be presented. Within headerfields, a name element may exist and if the header field's value should not be used in its entire occurrence as a proxy rule, a value element allows the value to be used with pre-defined values only. Furthermore, it is to be noted that each <name> entry is optional in the rule with several instances being possible utilizing various optional headerfields only (see introductory example on partial requests). One particular embodiment of the format may be, but is not limited to, the following.

```
<fqdn id="foo.com">
    <host>foo.com</host>
    <headerfields>
        <name>User-Agent</name>
        <value>Mozilla</value>
    </headerfields>
</fqdn>
```

Both FQDN-specific and generic elements are not limited in their number of occurrences, and if a rule is not found in the HTTP header, it may be ignored.

Operating on Proxy Rules

Figure 7:
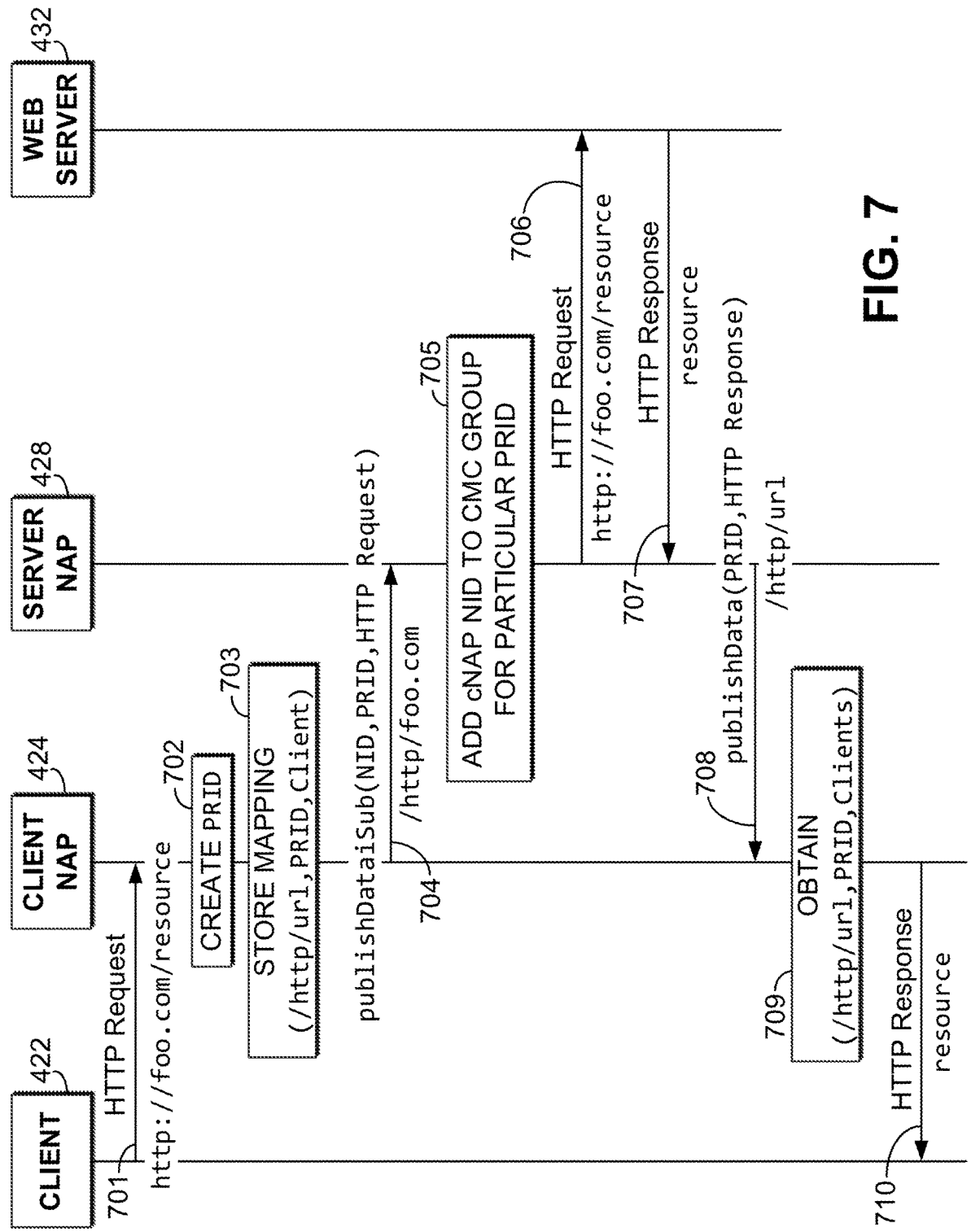
FIG. 7 depicts a message sequence chart for an embodiment of an HTTP request and HTTP response sequence between a client connected to a cNAP and a web server connected to a sNAP, operating under proxy rules.

The usage of the proxy rules allows multiple identical HTTP clients to be served by the same cNAP requesting the same content, while maintaining integrity. FIG. 7 depicts an embodiment of an example message sequence between a client 422 connected to a cNAP 424 and a web server 432 connected to a sNAP 428, during an HTTP request/response sequence. It is assumed that proxy rules have been populated according to the methods above and the ICN network is fully operational. Furthermore, the PCE communication used to enable HTTP publish/subscribe matches is not shown in FIG. 7.

In step 701, the IP client 422 served by the cNAP 424 is issuing an HTTP request to retrieve http://foo.com/resource.

In step 702, the cNAP parses the HTTP header and applies generic and FQDN-specific proxy rules received prior to this action in order to generate the proxy rule identifier (PRID). A PRID is a fingerprint for the combination of proxy rules and their values. In one embodiment, a PRID may be realized as a concatenation of all header fields and their values which are given as a string to a hashing function. As the PRID is part of the packet being sent to another NAP, any format which can be "encoded" as a unique stream of bit fields can be used.

In step 703, the cNAP stores a mapping identifying the requesting client 422 and the corresponding reverse CID (rCID) (/http/url) of the request and the PRID of the request. The identifier of the client waiting for the response may be, for example, an IP address along with port or a socket file descriptor, or the like.

In step 704, the cNAP publishes the HTTP request using CID /http/fqdn, /http/url as the rCID, and including the PRID in the message, such that all three elements are received by the sNAP. The cNAP may also include its node ID (NID).

In step 705, upon arrival of the message, the sNAP adds the cNAP (more precisely its NID) to a list of nodes that are waiting for the response, such as forming a coincidental multicast (CMC) group. This group creation is based on an identical rCID and PRID.

In step 706, the HTTP request is sent out to the web server 432 associated with the FQDN and the sNAP.

In step 707, the web server 432 provides the requested web resource via an HTTP response which is received by the sNAP 428.

The sNAP 428 has information indicating from which CMC group the HTTP request was sent. Using this information, in step 708, the sNAP publishes the HTTP response to all NIDs which requested the web resource (e.g., the CMC group), and includes the PRID again. Hence, there can be as many publish operations as there can be different PRIDs for a given rCID.

In step 709, based on the mapping stored in step 703 (rCID, PRID, Clients), the cNAP 424 identifies the IP endpoint or endpoints (e.g., clients) awaiting this particular response.

In step 710, the HTTP response is sent out to all clients with the same proxy rules fingerprint (PRID) which requested the same resource from the same FQDN.

In some embodiments, before publishing an HTTP request (step 704), the cNAP 424 determines whether an HTTP request for the same FQDN, web resource and PRID has already been published. If so, the cNAP 424 may decline to publish a duplicative HTTP request.

For example, avoiding sending unnecessary HTTP requests to the server (and therefore avoiding receiving unnecessary HTTP responses from the server at the sNAP) may be performed as follows. Upon receiving an HTTP response from the server, after previously sending the appropriate HTTP request, the sNAP checks the number of subscribers to the appropriate ICN name for the URL provided in the HTTP response (for example, count incoming HTTP request messages for the same URL, subscribe to a group size metadata information at a rendezvous point, etc.). The sNAP sends the HTTP response, e.g., in accordance with the methods outlined in WO2016123516A1. In some embodiments, the sNAP stores the PRID of said HTTP response in an internal table, together with the count previously determined. (In some embodiments, e.g. where the PRID does not include the URL, the URL and PRID may be stored together as a pair.) The sNAP receives incoming HTTP request messages from the ICN network and performs a check of whether the corresponding PRID matches any PRID stored in its internal table. If the PRID is not found, the HTTP request message is handled in accordance with the methods in WO2016123516A1. If the PRID is found, i) the HTTP request message is suppressed, e.g., not forwarded to the server; ii) the count in the corresponding table entry is lowered by 1; iii) if the count has reached zero, the table entry is removed; iv) if the count has not yet reached zero, the modified count is stored in the appropriate table entry. The method is realized similarly at an ICN border gateway in scenarios where the server resides in a peering IP network. In this case, the term 'server' in the steps above is replaced with the term 'peering IP network'.

In further embodiments, the disclosed systems and methods may incorporate a surrogate (or eNAP) manager, as disclosed in Provisional App. No. 62/309,610, to allow elastic service provisioning by intelligently activating and managing the surrogate eNAPs based on dynamic statistics reported from the network and the servers. For example, a surrogate manager may consider various metrics, such as server state, server statistics, network statistics, etc., and determine an optimal or preferable eNAP or the primary sNAP to respond to an HTTP request. In some embodiments, the namespace may be extended or otherwise modified to permit a surrogate manager to determine a scope path to be published for an HTTP request or other message (e.g., operating at the publish/subscribe level, in some embodiments integrated with the PCE). Accordingly, the surrogate manager and/or the PCE may determine whether or not to direct a particular request from a cNAP to a currently "better" eNAP than the primary sNAP.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

We claim:

1. A method performed by a client-side network attachment point (cNAP) on an information-centric network (ICN), the method comprising:
   receiving from a client an HTTP request, wherein the HTTP request is associated with a fully-qualified domain name (FQDN) of a host, and wherein the HTTP request includes a uniform resource locator (URL) and at least one header field;
   generating (i) a request proxy rule identifier (PRID) based on the at least one header field, (ii) a request content identifier (CID) based on the FQDN, and (iii) a request reverse content identifier (rCID) based on the URL;
   sending an outgoing ICN message requesting data, the outgoing ICN message comprising the request CID, the request PRID, and the HTTP request;
   in response to the outgoing ICN message, receiving an incoming ICN message comprising an HTTP response, a received PRID, and a received rCID; and in response to a determination that the received rCID and the received PRID are the same as the request rCID and the request PRID, respectively, providing the HTTP response to the client.

2. The method of claim 1, wherein generating the request PRID comprises:
   identifying an FQDN-specific proxy rule corresponding to the FQDN; and
   generating the request PRID according to the identified FQDN-specific proxy rule.

3. The method of claim 2, further comprising subscribing to a dedicated management namespace to receive FQDN-specific proxy rules associated with the FQDN.

4. The method of claim 3, wherein subscribing to receive the FQDN-specific proxy rules associated with the FQDN is performed in response to a determination that the cNAP has not already received the FQDN-specific proxy rules associated with the FQDN.

5. The method of claim 1, wherein the request PRID is generated using at least one generic proxy rule.

6. The method of claim 1, wherein generating the request PRID comprises:
   generating a string comprising the at least one header field; and
   applying a hash function to the string.

7. The method of claim 6, wherein generating the string comprises arranging attributes and values of the at least one header field in an XML, structure.

8. The method of claim 1, wherein the outgoing ICN message is a publish message.

9. The method of claim 1, further comprising storing a mapping between (i) an identifier of the client and (ii) the request rCID and the request PRID;
   wherein the determination that the received PRID is the same as the request PRID and the received rCID is the same as the request rCID is made using the stored mapping.

10. The method of claim 9, wherein the identifier of the client comprises an internet protocol (IP) address.

11. The method of claim 1, wherein the cNAP receives from a plurality of clients a plurality of HTTP requests from which a same request PRID, a same request CID and a same rCID are generated, and wherein the cNAP sends a single outgoing ICN message for the plurality of HTTP requests from which the same request PRID and the same request CID are generated.

12. The method of claim 1, wherein the client is an internet protocol (IP) client.

13. A client network attachment point (cNAP) on an information-centric network (ICN), the cNAP comprising a processor and a non-transitory computer storage medium storing instructions operative to perform functions comprising:
   receiving from a client an HTTP request, wherein the HTTP request is associated with a fully-qualified domain name (FQDN) of a host, and wherein the HTTP request includes a uniform resource locator (URL) and at least one header field;
   generating (i) a request proxy rule identifier (PRID) based on the at least one header field, (ii) a request content identifier (CID) based on the FQDN, and (iii) a request reverse content identifier (rCID) based on the URL;
   sending an outgoing ICN message requesting data, the outgoing ICN message comprising the request CID, the request PRID, and the HTTP request;
   in response to the outgoing ICN message, receiving an incoming ICN message comprising an HTTP response, a received PRID, and a received rCID; and
   in response to a determination that the received rCID and the received PRID are the same as the request rCID and the request PRID, respectively, providing the HTTP response to the client.

14. The cNAP of claim 13, wherein the outgoing ICN message further comprises a node identifier of the cNAP.

15. The cNAP of claim 13, wherein generating the request PRID comprises:
   identifying an FQDN-specific proxy rule corresponding to the FQDN; and
   generating the request PRID according to the identified FQDN-specific proxy rule.

16. The cNAP of claim 13, wherein generating the request PRID comprises:
   generating a string comprising the at least one header field; and
   applying a hash function to the string.

17. The cNAP of claim 13, wherein the functions further comprise receiving, from a plurality of clients, a plurality of HTTP requests from which a same request PRID, a same request CID and a same rCID are generated, and wherein the cNAP sends a single outgoing ICN message for the plurality of HTTP requests from which the same request PRID and the same request CID are generated.

18. The method of claim 1, wherein the outgoing ICN message further comprises a node identifier of the cNAP.

19. A method performed by a server-side network attachment point (sNAP) on an information-centric network (ICN), the method comprising:
   receiving a message including a node identifier (NID), a content identifier (CID) a proxy rule identifier (PRID), and an HTTP request, wherein the HTTP request includes a uniform resource locator (URL) and at least one header field, the PRID being based on the at least one header field;
   communicating the HTTP request to a web server associated with the CID;
   receiving an HTTP response from the web server, wherein the HTTP response includes a resource requested in the HTTP request; and
   publishing the HTTP response to the NID using a message that includes the PRID and a reverse content identifier (rCID) based on the URL.

20. The method of claim 19, further comprising adding the NID to a coincidental multicast (CMC) group associated with the PRID and the rCID, wherein publishing the HTTP response to the NID comprises publishing the HTTP response to a plurality of NIDs in the CMC group.

* * * * *